US012771266B2

(12) United States Patent
Nie et al.

(10) Patent No.: US 12,771,266 B2
(45) Date of Patent: Oct. 20, 2026

(54) SYNCHRONIZED TORQUE PULSATIONS FOR ELECTRIC DRIVE SYSTEMS

(71) Applicant: Ford Global Technologies, LLC, Dearborn, MI (US)

(72) Inventors: Yue Nie, Ann Arbor, MI (US); Chris Wolf, Ann Arbor, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 18/437,736

(22) Filed: Feb. 9, 2024

(65) Prior Publication Data

US 2025/0260346 A1 Aug. 14, 2025

(51) Int. Cl.

| | |
|---|---|
| ***H02P 1/54*** | (2006.01) |
| ***B60L 15/00*** | (2006.01) |
| ***B60L 15/08*** | (2006.01) |
| ***H02P 5/50*** | (2016.01) |
| ***H02P 21/22*** | (2016.01) |

(52) U.S. Cl.

CPC .............. *H02P 5/50* (2013.01); *B60L 15/007* (2013.01); *B60L 15/08* (2013.01); *H02P 21/22* (2016.02); *B60L 2240/421* (2013.01); *B60L 2240/423* (2013.01)

(58) Field of Classification Search

CPC .. H02P 27/06; H02P 5/50; H02P 21/22; H02P 2207/05; H02P 5/74; H02P 21/20; H02P 27/12

See application file for complete search history.

(56) References Cited

U.S. PATENT DOCUMENTS

| | | | | |
|---|---|---|---|---|
| 6,319,168 | B1 | 11/2001 | Morris et al. | |
| 11,077,759 | B1 | 8/2021 | Srinivasan | |
| 11,211,883 | B2 | 12/2021 | Matsunobu et al. | |
| 11,228,272 | B2 | 1/2022 | Tripathi | |
| 12,328,088 | B2 * | 6/2025 | Islam | H02P 5/74 |
| 2017/0174097 | A1 * | 6/2017 | Gillespey | B60L 3/12 |
| 2023/0253911 | A1 | 8/2023 | Islam | |
| 2023/0268852 | A1 | 8/2023 | Phillips et al. | |
| 2023/0308040 | A1 | 9/2023 | Farah et al. | |
| 2025/0206146 | A1 * | 6/2025 | Devaraj | B60K 17/02 |

FOREIGN PATENT DOCUMENTS

| | | | | |
|---|---|---|---|---|
| CN | 117621862 A | * | 3/2024 | B60L 15/38 |

* cited by examiner

*Primary Examiner* — Karen Masih

(74) *Attorney, Agent, or Firm* — McCoy Russell LLP

(57) ABSTRACT

Systems and methods for commanding an electric drive system for an electric or hybrid vehicle are described. In one example, the drive system is commanded by a controller that supplies synchronized pulsed torque commands that vary in magnitude and/or phase as a function of time when a driver of a vehicle requests a constant driver demand torque.

20 Claims, 10 Drawing Sheets

SYNCHRONIZED TORQUE PULSATIONS FOR ELECTRIC DRIVE SYSTEMS

FIELD

The present description relates to methods and a system for controlling torque of two electric machines in an electric drive system.

BACKGROUND

Some electric drive systems may come equipped with two electric machines. For example, a four wheel drive electric vehicle may include a first electric machine that selectively provides torque to a vehicle's front wheels and a second electric machine that selectively provides torque to the vehicle's rear wheels. Two electric machines in an electric drive system may offer the opportunity to increase vehicle driving dynamics and vehicle performance. However, increased losses may result from operating two electric machines in an electric drive system, thereby reducing a vehicle's driving range.

The background above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
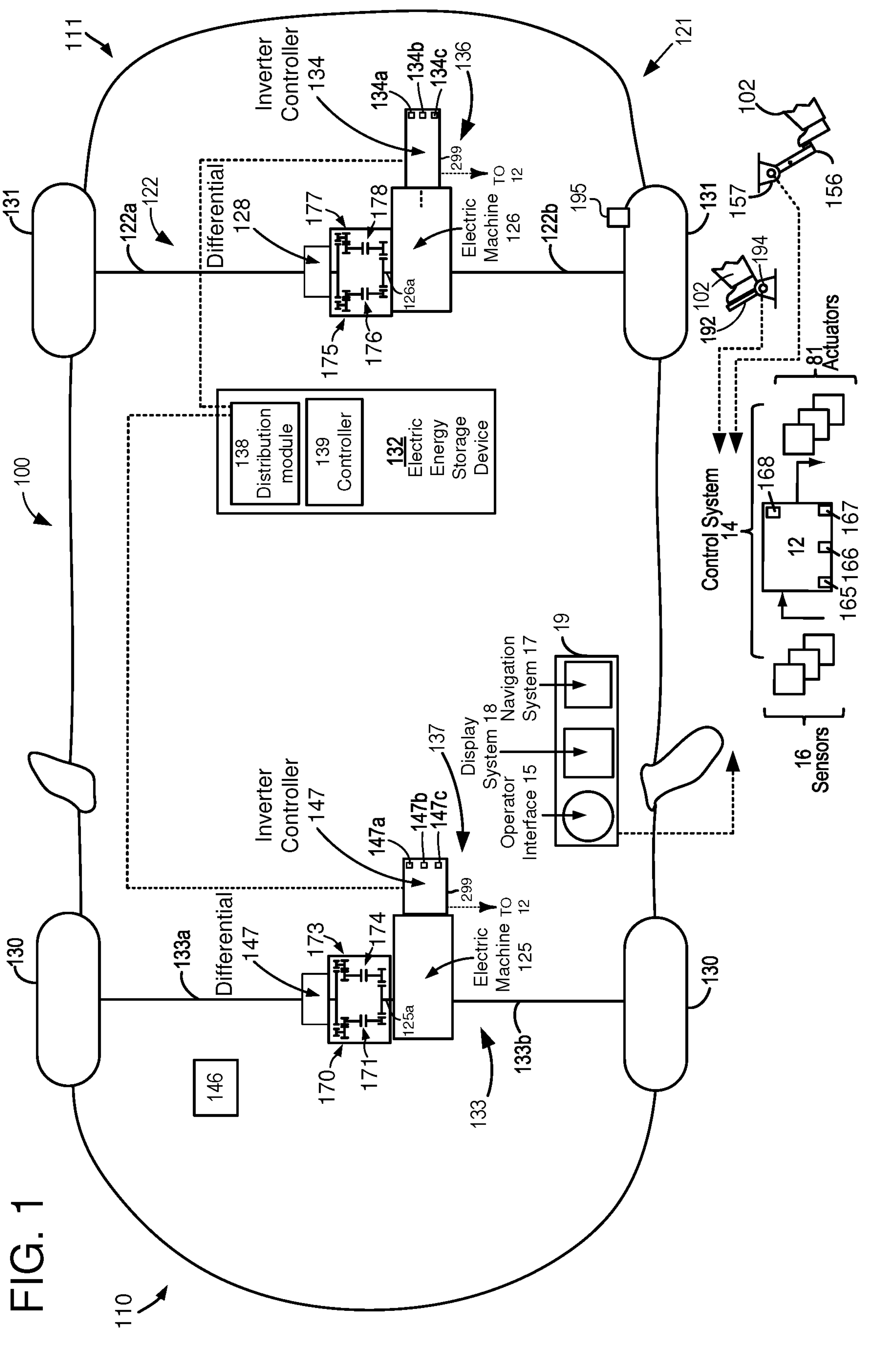
FIG. 1 is a schematic diagram of a vehicle that includes two electric machines for propulsion.
Figure 18:
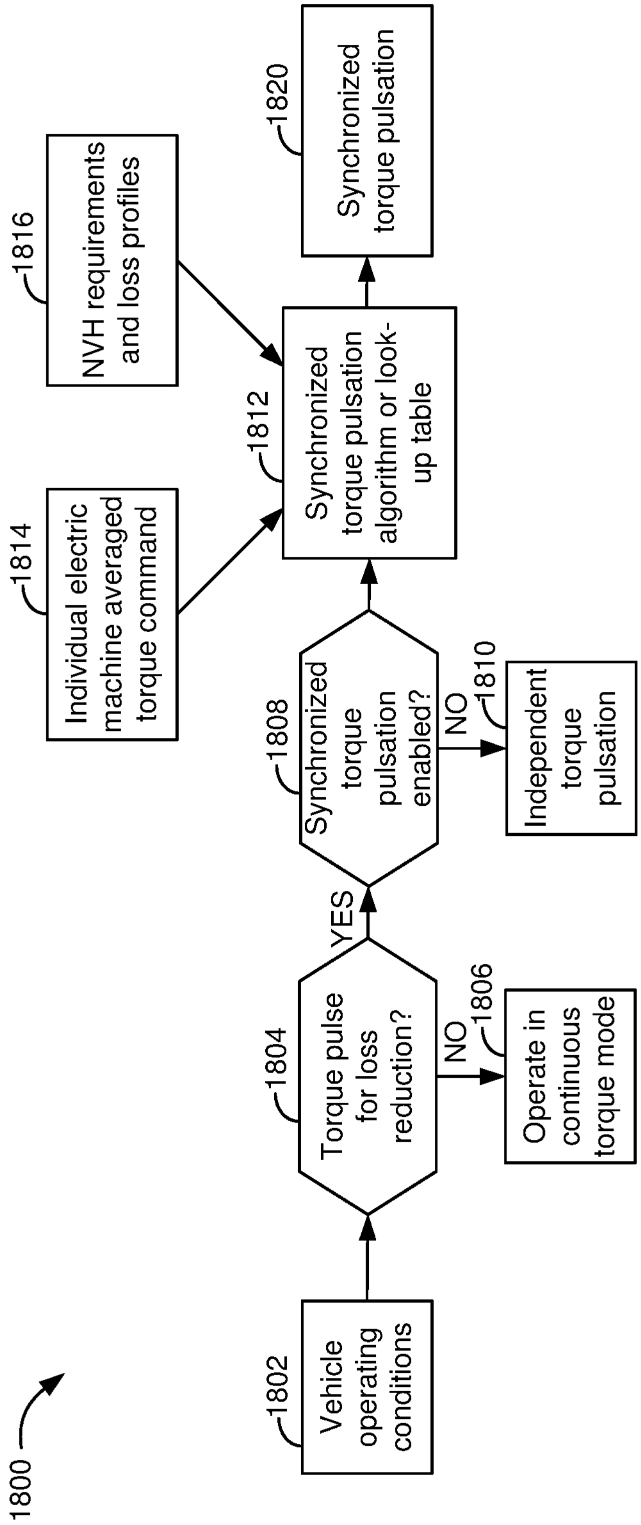
FIG. 18 shows a block diagram of a method for synchronizing torque pulsations according to vehicle operating conditions.
Figure 19:
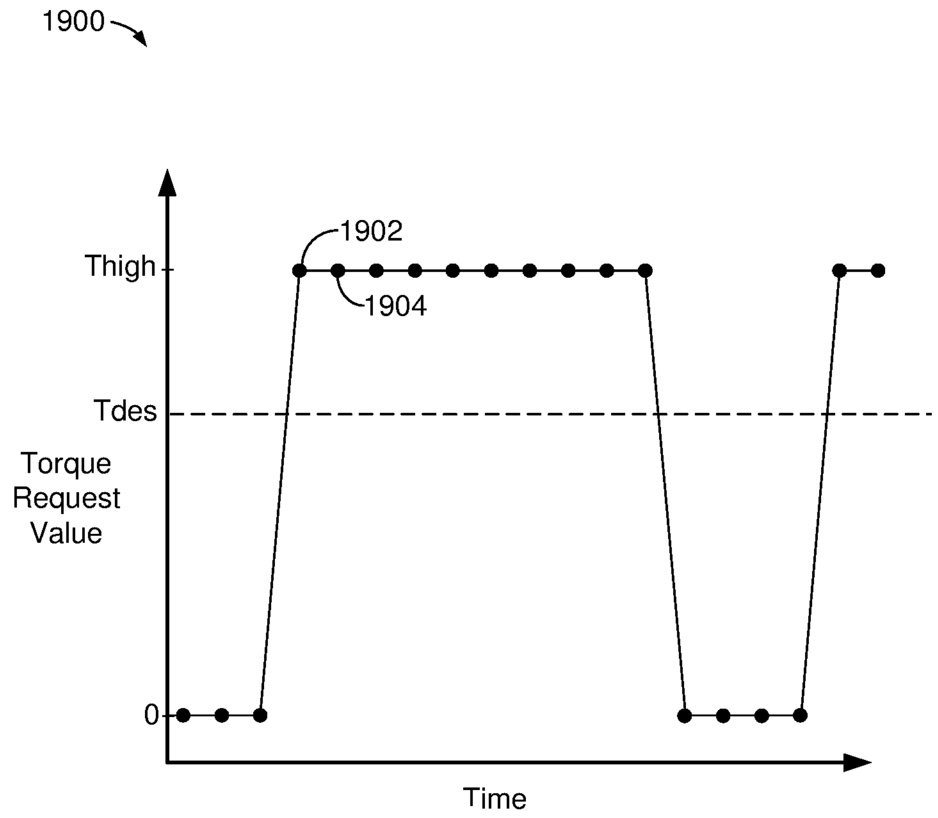
FIG. 19 shows a detailed view of an example pulsed torque command.

The present description is related to efficiency of an electric drive system that includes two electric machines. The efficiency of the electric drive system may be increased by commanding the electric drive systems via synchronized pulsed torque command signals. The pulsed torque command signals may be output by a controller when the electric machines operate in a range of predetermined operating conditions to increase electric drive system efficiency. The pulsed torque command signals may be applied in a vehicle of the type that is shown in FIG. 1. The pulsed torque command signals may be generated via a controller and input to an electric drive system as shown in the block diagram of FIG. 2. The pulsed torque commands may provide the efficiencies shown in FIGS. 3 and 4. FIGS. 5, 13, and 18 show methods for generating and delivering synchronized torque pulsations to two electric machines of an electric drive system. FIGS. 6-12, and 14-17 show how torque pulsations may be synchronized to increase electric drive efficiency. Finally, FIG. 19 shows a detailed view of a portion of a pulsed torque request.

An electric drive system that includes two electric machines may deactivate pulsed torque commands to the two electric machines according to a mapping that describes electric drive system losses for each of the electric machines to increase electric drive system efficiency. Further, one of the two electric machines may be deactivated at lower electric machine speeds and loads under an assumption that deactivating one of the electric machines would increase electric drive system efficiency. However, the inventors herein have determined that deactivating one of the electric machines according to a mapping that describes electric drive losses for each of the electric machines may increase electric drive system losses. Further, during some operating conditions, providing asynchronous torque pulsations to two electric machines may generate more noise and vibration than may be desired.

The inventors herein have recognized the above-mentioned issues and have developed an electric drive system, comprising: an electric drive system including a first inverter, a first electric machine, a second inverter, a second electric machine; and one or more controllers including executable instructions stored in non-transitory memory that cause the one or more controllers to generate synchronized pulsed torque commands for the first electric machine and the second electric machine.

By generating synchronized pulsed torque commands for a first electric machine and a second electric machine, it may be possible to reduce losses of an electric drive system while maintaining a lower level of noise and vibration as compared to operating the first and second electric machine according to asynchronous torque pulse commands. Further, when the asynchronous torque pulses are generated based on a mapping of losses for an electric drive system that includes two electric machines instead of a single electric machine, loss reduction of the electric drive system may be reduce further.

The present description may provide several advantages. In particular, the approach may be useful to extend a driving range of a vehicle. Further, the approach may reduce a possibility of generating noise and vibration harmonics that may be objectionable to vehicle occupants. Further still, the approach may provide smoother torque generation and lowered electric drive system losses.

The above advantages and other advantages, and features of the present description will be readily apparent from the following Detailed Description when taken alone or in connection with the accompanying drawings.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including front electric machine 125 and rear electric machine 126. Electric machines 125 and 126 may consume or generate electrical power depending on their operating mode. Throughout FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122*a*, and second half shaft 122*b*. Likewise, front axle 133 may comprise a first half shaft 133*a* and a second half shaft 133*b*. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126*a* of rear electric machine 126. Low gear 175 may be engaged via fully closing low gear clutch 176. High gear 177 may be engaged via fully closing high gear clutch 178. High gear clutch 177 and low gear clutch 178 may be opened and closed via commands received by rear drive unit 136 over CAN 299. Alternatively, high gear clutch 177 and low gear clutch 178 may be opened and closed via digital outputs or pulse widths provided via control system 14. Rear drive unit 136 may include differential 128 so that torque may be provided to axle 122*a* and to axle 122*b*. In some examples, an electrically controlled differential clutch (not shown) may be included in rear drive unit 136.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125*a* of front electric machine 125. Low gear 170 may be engaged via fully closing low gear clutch 171. High gear 173 may be engaged via fully closing high gear clutch 174. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. Front drive unit 137 may include differential 127 so that torque may be provided to axle 133*a* and to axle 133*b*. In some examples, an electrically controlled differential clutch (not shown) may be included in rear drive unit 137.

Electric machines 125 and 126 may receive electrical power from onboard electrical energy storage device 132. Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current generated by rear electric machine 126 to direct current for storage at the electric energy storage device 132 and vice versa. The first inverter system controller 134 may include a processor 134*a*, memory 134*b* (e.g., random access memory, read exclusive memory), input/output circuitry 134*c* (e.g., digital inputs/outputs, analog inputs/outputs, transistors, etc.). A second inverter system controller (ISC2) 147 may convert alternating current generated by front electric machine 125 to direct current for storage at the electric energy storage device 132 and vice versa. The second inverter system controller may include a processor 147*a*, memory 147*b* (e.g., random access memory, read exclusive memory), input/output circuitry 147*c* (e.g., digital inputs/outputs, analog inputs/outputs, transistors, etc.). Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 125, electric machine 126, energy storage device 132, etc. Control system 14 may receive sensory feedback information from one or more of electric machine 125, electric machine 126, energy storage device 132, etc. Further, control system 14 may send control signals (e.g., torque commands) to inverter system controllers 147 and 134 to operate electric machine 125 and electric machine 126. Control system 14 may also supply control commands to energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a driver demand pedal. Similarly, control system 14 may receive an indication of an operator requested vehicle slowing via a human operator 102, or an autonomous controller. For example, control system 14 may receive sensory feedback from pedal position sensor 157 which communicates with caliper application pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory (e.g., read exclusive memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator interface may include interfaces that utilize a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the electric machines.

Figure 2:
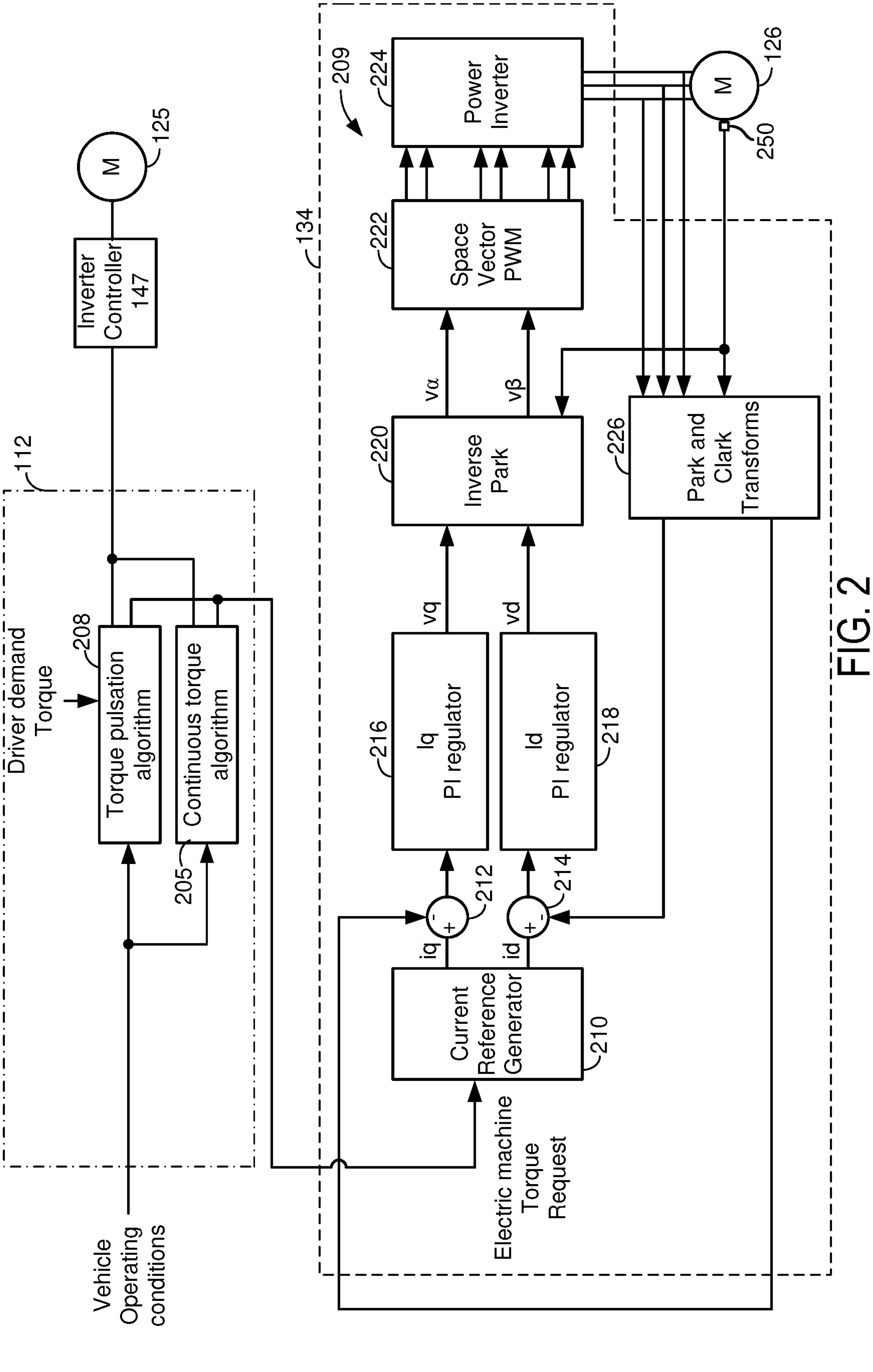
FIG. 2 is a block diagram of a controller that supplies a pulsed torque signal to an electric drive system that includes an electric machine.

Referring now to FIG. 2, a block diagram 200 of a controller 112 that supplies synchronized pulsed torque signal or commands to two electric drive systems, each of which includes an electric machine is shown. The controller 112 includes torque pulsation algorithm that may include one or more of the methods of FIGS. 5,13, and 18. Controller 112 may be included as executable instructions stored in controller 12 of FIG. 1. Alternatively, two controllers similar to controller 112, but each outputting a sole pulsed torque signal or command may be provided to generate torque signals or commands for each of inverter system controllers 147 and 134. Controller 112 includes a torque pulsation algorithm 208 and a continuous torque algorithm 205. The torque pulsation algorithm 208 may be activated during select operating conditions, such as the operating conditions shown in FIG. 4. The continuous torque algorithm 205 may be activated during other operating conditions. The continuous torque algorithm outputs a torque demand that is continuous rather than pulsed. In some examples, a controller 112 may be provided within each of inverter system controller 147 and inverter system controller 134 instead of controller 12 of FIG. 1. For such embodiments, the controllers 112 may communicate torque pulsation information (e.g., signal or command timings, amplitudes, frequencies, duty cycles, etc.) with each other.

The torque pulsation algorithm module 208 generates the synchronized pulsed torque requests or commands according to one or more of the methods of FIGS. 5, 13, and 18. The synchronized pulsed torque requests or commands are input to the first inverter system controller 134 and the second inverter system controller 147. In FIG. 2, a detailed view of first inverter system controller 134 is shown while a less detailed view of second inverter system controller 147 is shown; however, it may be understood that the second inverter system controller 147 is of the same form as the first inverter system controller 134.

Figure 16:
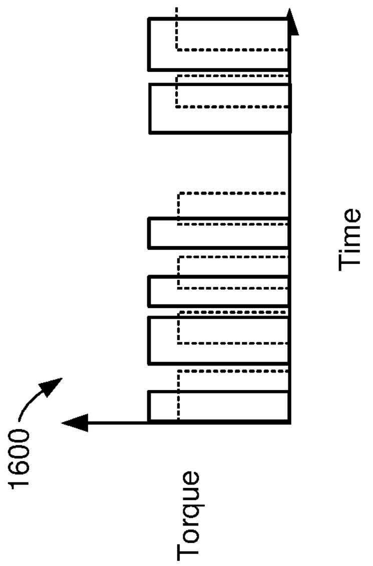

One of the synchronized pulsed torque request or command (e.g., a signal that moves between the two boundary values without moving to intermediate values when switching between the two values as shown in FIG. 16) may be output to a space vector pulse width modulation motor controller 209 that operates electric machine 126. Space vector pulse width modulation motor controller 209 may be included in first inverter system controller 134 or controller 112.

In this example, electric machine 126 is a three phase electric machine that is supplied with electric power via power inverter 224. The amounts of electric current that are supplied in each of the three phases is input to block 226 where Park and Clark transforms convert the electric currents from each of the three phases into a measured torque current $i_q$ and a measured flux current $i_d$. The measured flux current $i_d$ is subtracted from the commanded flux current $i_d$ at junction 214 (e.g., summing junction). The measured torque current $i_q$ is subtracted from the commanded torque current $i_q$ at junction 212 (e.g., summing junction). One of the synchronized pulsed torque request or command signals is input to current reference generator 210 and current reference generator 210 decomposes the synchronized pulsed torque request and outputs a commanded flux current $i_d$ and a commanded torque current $i_q$ to generate the commands that cause electric machine 126 to generate the average of the pulsed torque request, which is equivalent to the driver demand requested torque. The synchronized pulsed torque request or command is generated so as to request or command a predetermined fraction of the driver demand torque (e.g., one half driver demand torque) from the first electric machine. The synchronized pulsed torque command or request for the second electric machine outputs a request for a remaining fraction of the driver demand torque so that the synchronized pulsed torque commands or requests cause the driver demand torque to be generated via the first and second electric machines. Note that the driver demand requested torque may correspond to a torque output of the electric machine, a wheel torque, or an intermediate torque between electric machine torque and wheel torque. If the driver demand torque corresponds to a torque other that output torque of the electric machines, the commanded output torque for the electric machines may be compensated or adjusted for any gear ratios that may exist between the electric machines and the location in the vehicle propulsion system that corresponds to the driver demand torque.

A torque current proportional/integral controller 216 receives a torque current error from junction 212 and outputs a torque voltage $v_q$ command. Similarly, a flux current proportional/integral controller 218 receives a flux current error from junction 214 and outputs a flux voltage $v_d$ command. The torque voltage $v_q$ command and the flux voltage command $v_d$ are processed via an inverse Park transform at block 220 into a torque voltage in a rotating reference frame $v_\alpha$ and a flux voltage in the rotating reference frame $v_\beta$. At block 222, the torque voltage in the rotating reference frame $v_\alpha$ and the flux voltage in the rotating reference frame $v_\beta$ are converted into phase pulses via space vector pulse width modulation. The pulses operate the transistors or switches in the power inverter 224. The power inverter 224 outputs voltages for each of the phase windings of electric machine 126. The position of electric machine 126 is converted into an angle and the angle is supplied to blocks 220 and 226 for the inverse Park transform and the Park and Clark transforms.

Thus, a synchronized pulsed torque request may be converted into two electric current commands and the two electric current commands are converted into pulse width modulated pulses. The pulse width modulated pulses control the voltage that is supplied to electric machine 126. The other synchronized pulsed torque request or command output from controller 112 may be processed similarly via second inverter system controller 147 to operate second electric machine 125.

The system of FIGS. 1 and 2 provides for an electric drive system, comprising: a first inverter, a first electric machine, a second inverter, a second electric machine; and one or more controllers including executable instructions stored in non-transitory memory that cause the one or more controllers to generate synchronized pulsed torque commands for the first electric machine and the second electric machine. In a first example, the electric drive system includes where the synchronized pulsed torque commands alternate between a first range of torque values and a second value, where the second value is less than the first range of torque values. In a second example that may include the first example, the electric drive system includes where the synchronized pulsed torque commands for the first electric machine and the second electric machine have a same frequency. In a third example that may include one or both of the first and second examples, the electric drive system includes where synchronized pulsed torque commands for the first electric machine and the second electric machine have different duty cycles. In a fourth example that may include one or more of the first through third examples, the electric drive system includes where synchronized pulsed torque commands for the first electric machine and the second electric machine have same duty cycles. In a fifth example that may include one or more of the first through fourth examples, the electric drive system includes where synchronized torque pulse commands for the first electric machine and second electric machine include timing of torque pulses for the first electric machine that overlap timing of torque pulses for the second electric machine. In a sixth example that may include one or more of the first through fifth examples, the electric drive system includes where synchronized pulsed torque commands for the first electric machine and second electric machine include timing of torque pulses for the first electric machine that do not overlap timing of torque pulses for the second electric machine. In a seventh example that may include one or more of the first through sixth examples, the electric drive system includes where the synchronized pulsed torque commands include pulsed torque commands for the first electric machine and pulsed torque commands for the second electric machine that synchronize on a pulse event level of the pulsed torque commands for the first electric machine.

The system of FIGS. 1 and 2 also provides for an electric drive system, comprising: a first inverter, a first electric machine, a second inverter, a second electric machine; and one or more controllers including executable instructions stored in non-transitory memory that cause the one or more controllers to generate synchronized pulsed torque commands for the first electric machine and the second electric machine, where the synchronized pulsed torque commands for the first electric machine and the second electric machine are generated based on a loss profile. In a first example, the electric drive system includes where the loss profile describes a relationship between losses of the electric drive system and torque generated via the first electric machine and the second electric machine. In a second example that may include the first example, the electric drive system includes where the synchronized pulsed torque commands alternate between a first range of torque values and a second torque value, where the second torque value is lower than the first range of torque values. In a third example that may include one or both of the first and second examples, the electric drive system includes where the first range of torque values are equal constant values or values that have a range that varies by less than five percent of full scale torque for the first electric machine. In a fourth example that may include one or more of the first through third examples, the electric drive system includes where magnitudes of the synchronized pulsed torque commands are adjusted in response to speeds and torques of the first electric machine and the second electric machine.

Figure 3:
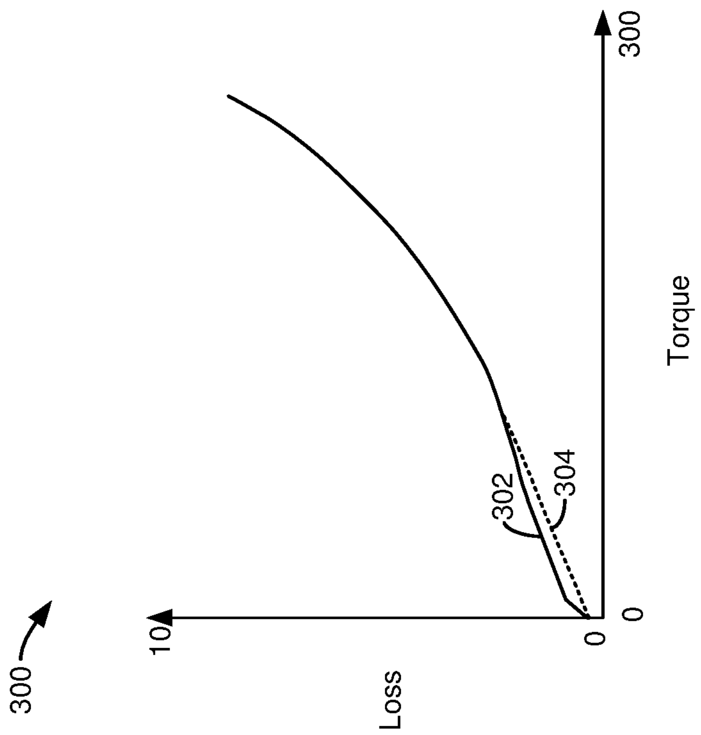

Turning now to FIG. 3, a plot 300 of electric machine losses for a single electric machine verses electric machine torque is shown. Plot 300 includes a vertical axis that represents losses of the electric machine and the amount of losses increases in the direction of the vertical axis arrow. The greater the loss value, the lower the electric machine efficiency. The horizontal axis represents torque output of the electric machine and torque output increases in the direction of the horizontal axis arrow. Solid line curve 302 represents losses of an electric machine when a torque request for the electric machine is not pulsed. Dashed line 304 represents losses of the same electric machine when the torque request for the electric machine is pulsed. It may be observed that the torque losses for the electric machine are lower when the torque request is pulsed. Accordingly, there may be benefits to providing a pulsed torque request to an electric drive system.

Figure 4:
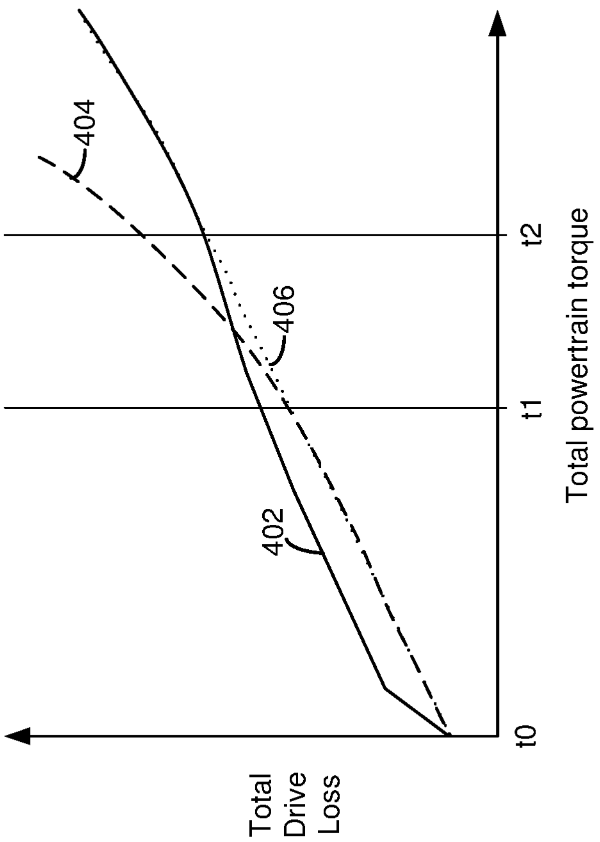
FIGS. 3 and 4 show plots of electric machine operating regions where losses of an electric machine may be lowered.
Figure 5:
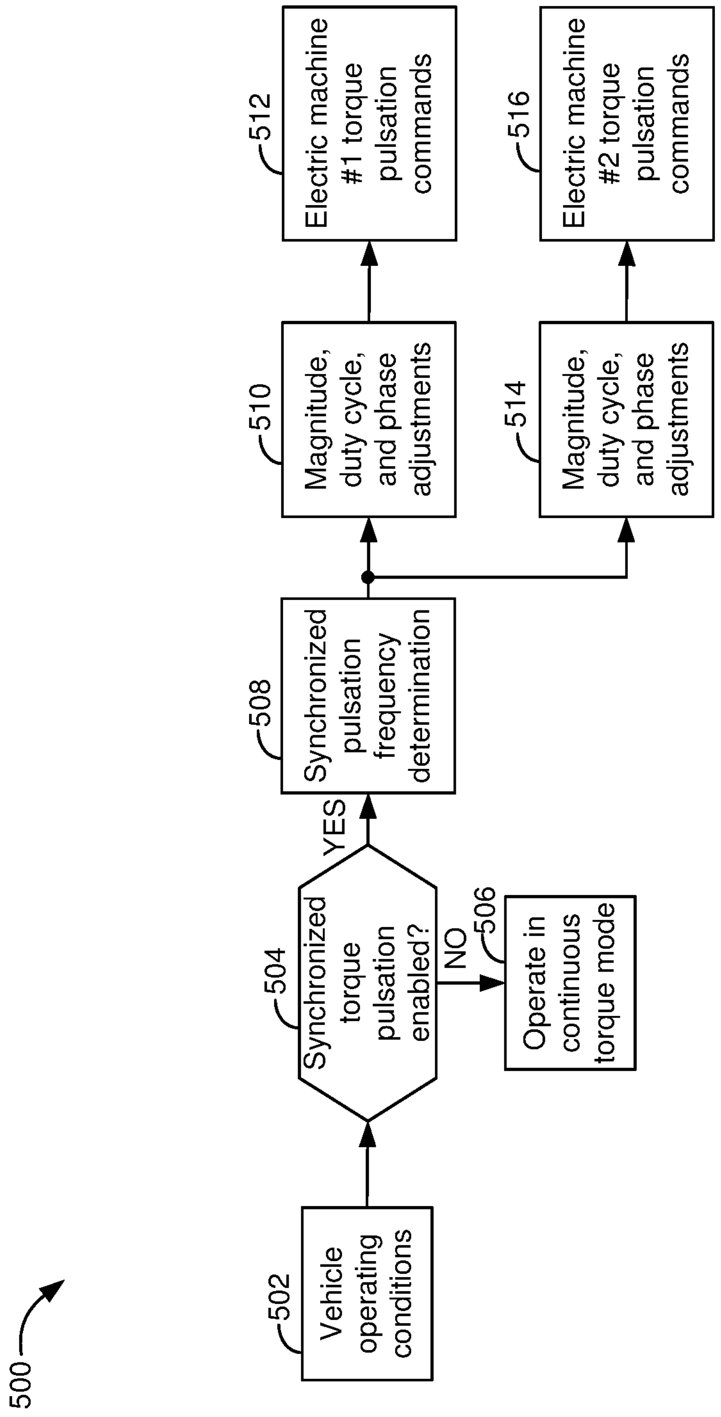
FIG. 5 shows a block diagram of a method for synchronizing pulsed operation of two electric machines.

Moving on to FIG. 4, a plot 400 of electric machine losses for a single electric machine and two electric machines verses electric machine torque is shown. Plot 400 includes a vertical axis that represents total losses of the electric machines and the amount of total losses increase in the direction of the vertical axis arrow. The horizontal axis represents a total powertrain torque output of the electric machines and total torque output increases in the direction of the horizontal axis arrow. Solid line curve 402 represents losses of two electric machine drives when a torque request for the electric machine is not pulsed. Dashed line 404 represents losses of a single electric drive when the torque request for the single electric drive (e.g., a drive where a sole electric machine is activated and provides torque to the powertrain) is pulsed. Dotted line 406 represents losses for a two electric drives (e.g., where two electric machines are activated and provide torque to the powertrain) when the torque request for two electric drives is pulsed. It may be observed that the torque losses for the single electric drive are higher than for the two electric drives when the torque request is between torque t1 and torque t2. Consequently, the powertrain is more efficient when two electric drives are commanded with torque pulses when the total powertrain torque is between torque t1 and torque t2. is pulsed. Additionally, for total powertrain torque between torque t0 and torque t1, operating two electric drives is as efficient as operating the sole electric drive. Accordingly, there may be benefits to providing synchronized pulsed torque requests to two different electric drives to generate a requested driver demand torque.

Turning now to FIG. 5, a block diagram of a first method to provide synchronized torque pulsations to two different electric drives is shown. The method of FIG. 5 may be included as executable instructions in non-transitory memory of one or more controllers. Further, the method of FIG. 5 may be performed via the system of FIGS. 1 and 2. Further still, the method of FIG. 5 may be performed in cooperation with the methods of FIGS. 13 and 18. The method of FIG. 5 may also include actions taken in the physical world to transform operating states of the system of FIGS. 1 and 2. The method of FIG. 5 may execute when a vehicle is operating at predetermined conditions (e.g., a particular speed and driver demand torque range).

At 502, vehicle operating conditions are determined. Vehicle operating conditions may include, but are not limited to driver demand torque, vehicle speed, electric machine speed, and vehicle drive mode (e.g., two-wheel drive, four-wheel drive, etc.). Method 500 proceeds to 504.

At 504, method 500 judges whether or not synchronized torque pulsation (e.g., delivering torque pulses to two electric machines) is enabled. Synchronized torque pulsation may be enabled when it is determined that the vehicle is operating at conditions where synchronized torque pulsations may increase electric drive efficiency. In one example, method 500 may make such a determination based on a relationship between drive losses and total powertrain torque as shown in FIG. 4. For example, if driver demand torque and powertrain torque is between torque t0 and torque t2 as shown in FIG. 4, method 500 may judge that synchronized torque pulsations are to be generated and enabled. If method 500 judges that synchronized torque pulsations are to be enabled, the answer is yes and method 500 proceeds to 508. Otherwise, the answer is no and method 500 proceeds to 506.

At 506, method 500 operates one or two electric drives in a continuous mode where torque pulsations are not provided. When operating in continuous mode, the two electric drives may be supplied with torque commands or requests that are based on driver demand torque and vehicle speed or electric machine speed. Method 500 exists after entering continuous torque mode.

At 508, method 500 determines a frequency for synchronized torque pulsation generation. Synchronized torque pulsation generation may allow noise and vibrations of two electric drive systems to be reduced when the two electric machines are responding to pulsed torque commands or requests to achieve increased powertrain efficiency. The two electric drive systems are to be commanded with torque pulses that have a same frequency. In one example, the frequency may be determined via indexing a table or function that outputs a frequency in response to vehicle operating conditions (e.g., vehicle speed, driver demand torque, electric machine speed, electric machine temperature, battery temperature, etc.). The frequency values in the tables or functions may be determined via operating a vehicle on a dynamometer and adjusting frequency values until desired vehicle operating characteristics (e.g. higher efficiency, lower noise, lower vibration, etc.) are achieved. By synchronizing the torque pulsations to a single frequency at a particular set of vehicle operating conditions, generation of pulses that are synchronized may be provided. Method 500 proceeds to 510 and 512.

At 510, method 500 determines a magnitude of the torque pulsations that are to be generated for the first electric drive, duty cycle of the torque pulsations that are to be generated for the first electric drive, and phase adjustments to the torque pulsations that are to be generated for the first electric drive. Method 500 may look up values of these parameters using tables or functions in a similar way as frequency values where determined. Further, magnitude, phase, and duty cycle values may be determined empirically via a dynamometer as mentioned for frequency determination. Method 500 proceeds to 512.

At 512, method 500 generates pulsed torque commands for the first electric drive system and first electric machine. In on example, method 500 may generate the pulsed torque commands via a pulse generating algorithm that may execute at a fixed time interval. Alternatively, method 500 may follow a predetermined pulse profile that is stored in controller memory. Method 500 commands the first electric drive with a pulsed torque command as shown in FIGS. 6-12, for example. Method 500 exits.

At 514, method 500 determines a magnitude of the torque pulsations that are to be generated for the second electric drive, duty cycle of the torque pulsations that are to be generated for the second electric drive, and phase adjustments to the torque pulsations that are generated for the second electric drive. Method 500 may look up values of these parameters using tables or functions in a similar way as frequency values where determined. Method 500 proceeds to 516.

At 516, method 500 generates pulsed torque commands for the second electric drive system and second electric machine. In on example, method 500 may generate the pulsed torque commands via a pulse generating algorithm that may execute at a fixed time interval. Alternatively, method 500 may follow a predetermined pulse profile that is stored in controller memory. Method 500 commands the second electric drive with a pulsed torque command as shown in FIGS. 6-12, for example. Method 500 exits.

In examples where a single controller generates the synchronized torque pulses for the first and second electric drives, the controller may adjust the timing between the torque pulses for the first electric drive and the second electric drive as shown in FIGS. 6-12. Since the single controller controls both torque pulse trains, the single controller knows the relative timing between the two torque pulse trains.

In examples where two or more controllers generate the synchronized torque pulses for the first and second electric drives, one controller may operate as a lead controller and the other controller may operate as a secondary controller where the secondary controller outputs pulses according to an output of the lead controller. The pulsed torque commands shown in FIGS. 6-12 and 14-17 may be generated and delivered to the electric drive for the first electric machine and the electric drive for the second electric machine via data values (e.g., digital signals) or as analog signals.

Figure 6:
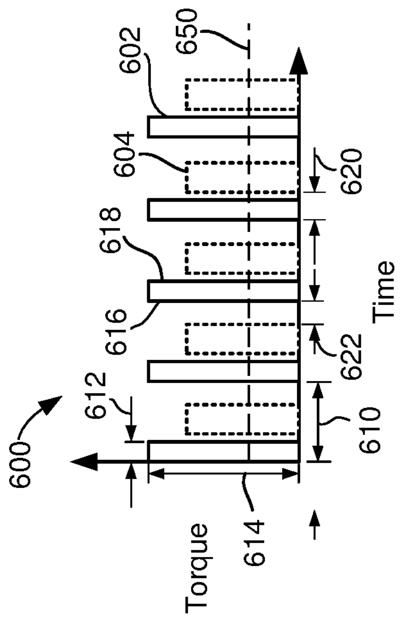

Referring now to FIG. 6, a plot 600 shows how pulsed torque commands or requests may be generated by the method of FIG. 5. In this example, there are zero torque periods between the torque pulse commands for the first electric drive and electric machine and torque pulse commands for the second electric drive and electric machine. Further, the magnitudes of the torque pulses for the first electric drive and electric machine are different from the magnitudes of the torque pulses for the second electric drive and electric machine.

In this example, the pulsed torque commands or requests are generated in response to a constant driver demand torque request. Plot 600 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 602 represents pulsed torque commands for the first electric drive and electric machine. Dashed trace 604 represents pulsed torque commands for the second electric drive and electric machine. The torque value at the level of the horizontal axes in FIGS. 6-12 and 14-17 is zero.

In this example, for the first electric drive and electric machine, the period of the pulsed torque command is indicated at 610, the duty cycle is indicated at 612, and the magnitude is indicated at 614. The rising edge of the pulsed torque command for the first electric drive and electric machine is indicated at 616 and its falling edge at 618. The pulsed torque command for the second electric drive and electric machine has a period that is the same as the period for the pulsed torque command for the first electric drive and electric machine. However, there is a phase difference, as indicated at 620, between the rising edges of the pulsed torque command for the first electric drive and electric machine and the rising edges for the second electric drive and electric machine. Further, there are zero torque periods as indicated at 622 where zero torque is requested for both the first and second electric drives and electric machines. Both signals have a same frequency so they are synchronized with respect to time as they have a same period. Such torque pulsations may reduce electric drive losses and reduce electric drive and electric machine noise and vibration. In this example, the timing and of the rising edges and falling edges of the pulsed torque commands for the first electric drive and the second electric drive is such that there is no overlap between the pulsed torque commands.

The duty cycle of the first electric drive and electric machine the pulsed torque command is 602 is shorter than the duty cycle of the second electric drive and electric machine, the period of the pulsed torque command 604. However, magnitude of the first electric drive and electric machine the pulsed torque command is 602 is greater than the magnitude of the second electric drive and electric machine so that both the first electric machine and the second electric machine generate a same average torque as indicated at line 650.

Note that although the rising and falling edges of the pulsed torque command signals 602 and 604 extend between the torque lower bound value (e.g., zero) and peak values of individual torque pulses, intervening torque values between the lower bound and peak values are not included as values in the pulsed torque request. The pulsed torque commands or requests contain values solely comprising a lower value and peak values for each torque pulse. The rising and falling edges that are shown between the lower bound and upper bound torque pulse command values are shown simply so that one may follow the trace more easily. The same is true throughout this disclosure except where indicated. Further, the upper bounds (e.g., high side of pulsed torque command) of the pulsed torque commands may cover a range of values, as such, it may be appreciated that the pulsed torque commands disclosed herein contemplate range bound upper (high side) torque command values.

Figure 7:
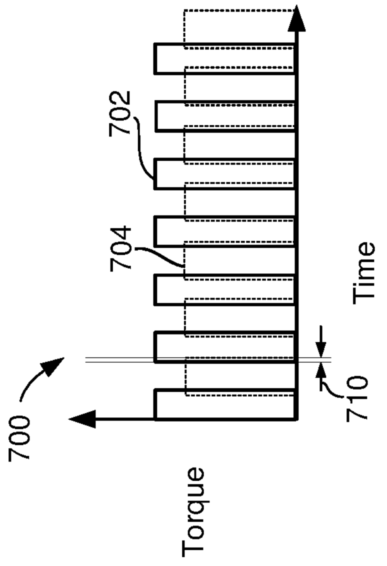

Referring now to FIG. 7, a plot 700 shows how pulsed torque commands or requests may be generated by the method of FIG. 5. In this example, there is overlap between the torque pulse commands for the first electric drive and electric machine and torque pulse commands for the second electric drive and electric machine. Further, the magnitudes of the torque pulses for the first electric drive and electric machine are different from the magnitudes of the torque pulses for the second electric drive and electric machine.

In this example, the pulsed torque commands or requests are generated in response to a constant driver demand torque request. Plot 700 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 702 represents pulsed torque commands for the first electric drive and electric machine. Dashed trace 704 represents pulsed torque commands for the second electric drive and electric machine.

In this example, the pulsed torque command for the second electric drive and electric machine has a period that is the same as the period for the pulsed torque command for the first electric drive and electric machine. However, the timing of the two signals is different such that there are periods of overlap as indicated at 710 where the pulsed torque command for the second electric drive is at a lower level while the pulsed torque command for the first electric drive and electric machine is at a higher level. Both signals have a same frequency so they are synchronized with respect to time as they have a same period. The overlap periods may help to reduce electric drive and electric machine noise and vibration.

Figure 8:
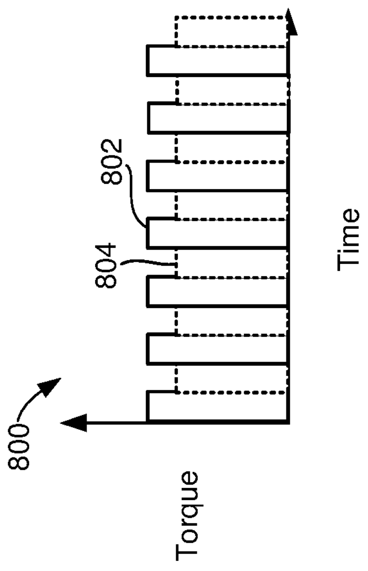
FIGS. 6-12 show plots of ways that a synchronized torque pulsation commands may be adjusted.

Referring now to FIG. 8, a plot 800 shows how pulsed torque commands or requests may be generated by the method of FIG. 5. In this particular example, the pulsed torque commands are complementary because the pulsed torque command for the second electric drive and electric machine is at a higher torque level when the pulsed torque command for the first electric drive and electric drive zero. As a result, torque delivery to the vehicle powertrain is continuous. In addition, the magnitudes of the torque pulses for the first electric drive and electric machine are different from the magnitudes of the torque pulses for the second electric drive and electric machine.

In this example, the pulsed torque commands or requests are generated in response to a constant driver demand torque request. Plot 800 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 802 represents pulsed torque commands for the first electric drive and electric machine. Dashed trace

804 represents pulsed torque commands for the second electric drive and electric machine.

In this example, the pulsed torque command for the second electric drive and electric machine has a period that is the same as the period for the pulsed torque command for the first electric drive and electric machine. However, the timing of the two signals is different such that there is no overlap. Rather, the timing of rising edges of the pulsed torque commands for the first electric drive and electric machine are the same as timing of falling edges for pulsed torque commands for the second electric drive and electric machine. Both signals have a same frequency so they are synchronized with respect to time as they have a same period. The non-overlapping periods may help to give a feeling of continuous torque delivery to the powertrain to reduce a possibility of vehicle speed variation during pulsed torque operation.

Figure 9:
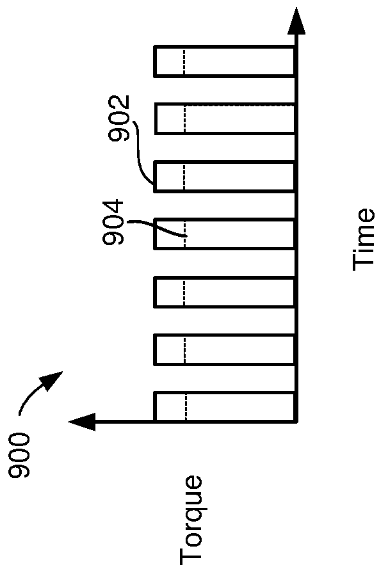

Referring now to FIG. 9, a plot 900 shows how pulsed torque commands or requests may be generated by the method of FIG. 5. In this example, the pulsed torque commands are occurring at a same time as they occur and are delivered to the first and second electric drives at a same time. In addition, the magnitudes of the torque pulses for the first electric drive and electric machine are different from the magnitudes of the torque pulses for the second electric drive and electric machine.

In this example, the pulsed torque commands or requests are generated in response to a constant driver demand torque request. Plot 900 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 902 represents pulsed torque commands for the first electric drive and electric machine. Dashed trace 904 represents pulsed torque commands for the second electric drive and electric machine.

In this example, the pulsed torque command for the second electric drive and electric machine has a period that is the same as the period for the pulsed torque command for the first electric drive and electric machine. Further, the timing of the two signals is the same such that there is overlap between timing of the pulsed torque commands. Both signals have a same frequency so they are synchronized with respect to time as they have a same period. The overlapping periods may provide some noise and/or vibration reduction during some vehicle operating conditions.

Figure 10:
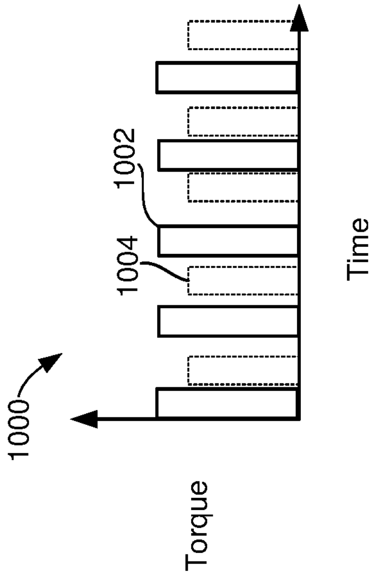
Figure 11:
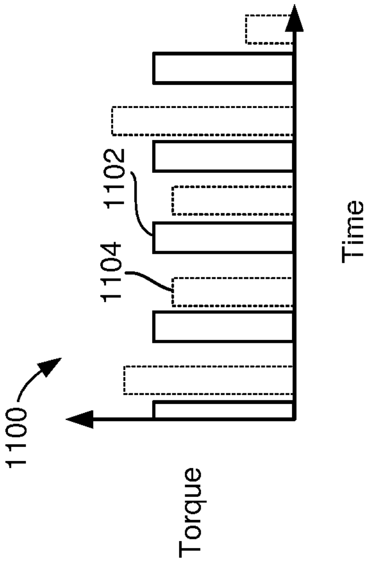

FIGS. 10-11 show synchronized pulsed torque commands for the first electric drive and electric machine and the second electric drive and electric machine that have been adjusted in phase, magnitude, and duty cycle respectively. The adjustments may be applied on each single torque pulse command or a sequence of torque pulse commands together, and all adjustments may be either fixed, randomized, or dependent of adjustments of other electric drives.

Moving on to FIG. 10, a plot 1000 shows how pulsed torque commands or requests may be generated by the method of FIG. 5. In this example, the pulsed torque commands are synchronous in time, but the pulsed torque commands for the second electric drive and second electric machine are adjusted in phase with respect to the pulsed torque commands for the first electric drive and first electric machine. In addition, the magnitudes of the torque pulses for the first electric drive and electric machine are different from the magnitudes of the torque pulses for the second electric drive and electric machine.

In this example, the pulsed torque commands or requests are generated in response to a constant driver demand torque request. Plot 1000 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 1002 represents pulsed torque commands for the first electric drive and electric machine. Dashed trace 1004 represents pulsed torque commands for the second electric drive and electric machine.

Here, the pulsed torque command for the second electric drive and electric machine has a phase that is adjusted with respect to the timing of the high or non-zero portion of the pulsed torque command for the first electric drive and electric machine. In this example, the phase between the high side or non-zero portion of pulsed torque command for the second electric drive and electric machine has a phase that is adjusted with respect to the timing of the high or non-zero portion of the pulsed torque command for the first electric drive and electric machine. Both signals have a same frequency so they are synchronized with respect to time as they have a same period. By randomly adjusting the phase of the pulsed torque commands, it may be possible to overcome the possibility of creating resonance vibrations within the electric drive system and electric machines.

Moving on to FIG. 11, a plot 1100 shows how pulsed torque commands or requests may be generated by the method of FIG. 5. In this example, the pulsed torque commands are synchronous, but the pulsed torque commands for the second electric drive and second electric machine are adjusted in phase with respect to the pulsed torque commands for the first electric drive and first electric machine. In addition, the magnitudes of the torque pulses for the first electric drive and electric machine are different from the magnitudes of the torque pulses for the second electric drive and electric machine.

In this example, the pulsed torque commands or requests are also generated in response to a constant driver demand torque request. Plot 1100 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 1102 represents pulsed torque commands for the first electric drive and electric machine. Dashed trace 1104 represents pulsed torque commands for the second electric drive and electric machine.

For this adjustment, the magnitudes for the pulsed torque commands for the second electric drive and electric machine are adjusted with respect to time. Both signals have a same frequency so they are synchronized with respect to time as they have a same period. By randomly adjusting the magnitude of the pulsed torque commands, it may be possible to overcome the possibility of creating resonance vibrations within the electric drive system and electric machines.

Figure 12:
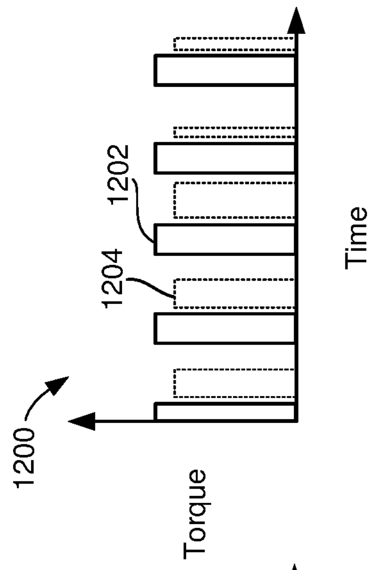
Figure 13:
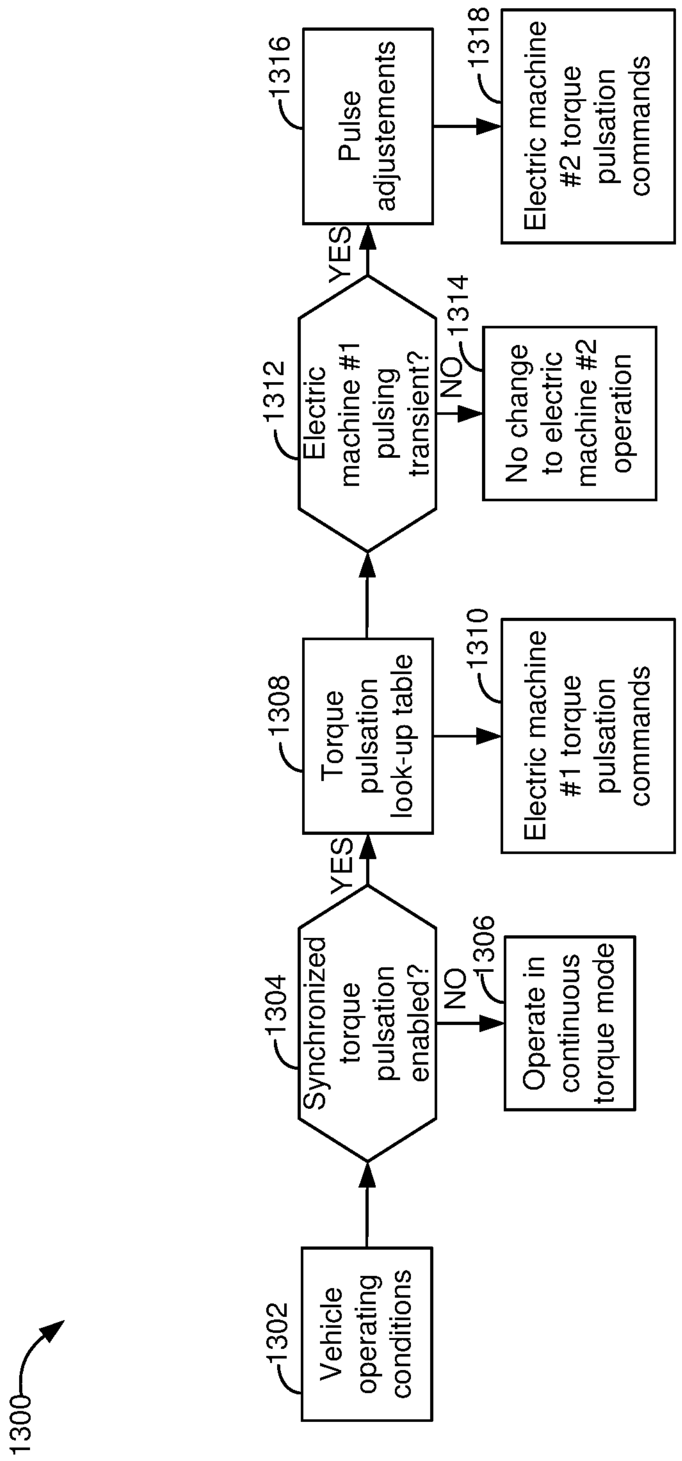
FIG. 13 shows a method synchronizing torque pulsations at a pulsating event level.

Referring now to FIG. 12, a plot 1200 shows how pulsed torque commands or requests may be generated by the method of FIG. 5. In this example, the pulsed torque commands occur at a same time, but the duty cycle of the pulsed torque commands for the second electric drive and second electric machine are adjusted while the duty cycle for the pulsed torque commands for the first electric drive and first electric machine remain constant.

In this example, the pulsed torque commands or requests are also generated in response to a constant driver demand torque request. Plot 1200 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 1202 represents pulsed torque commands for the first electric drive and electric machine. Dashed trace 1204 represents pulsed torque commands for the second electric drive and electric machine.

For this adjustment, the duty cycle of the non-zero portion of the pulsed torque commands for the second electric drive and electric machine are adjusted with respect to time. Both signals have a same frequency so they are synchronized with respect to time as they have a same period. By randomly adjusting the duty cycle of the pulsed torque commands, it may be possible to overcome the possibility of creating resonance vibrations within the electric drive system and electric machines.

Turning now to FIG. 13, a block diagram of a second method to provide synchronized torque pulsations to two different electric drives is shown. The method of FIG. 13 may be included as executable instructions in non-transitory memory of one or more controllers. Further, the method of FIG. 13 may be performed via the system of FIGS. 1 and 2. Further still, the method of FIG. 13 may be performed in cooperation with the methods of FIGS. 5 and 18. The method of FIG. 13 may also include actions taken in the physical world to transform operating states of the system of FIGS. 1 and 2. The method of FIG. 13 may execute when a vehicle is operating at predetermined conditions (e.g., a particular speed and driver demand torque range). Method 1300 may be applied when controllers in the respective electric drives generate the pulsed torque commands. A first controller may send a synchronizing signal to the other controller so that the second controller may output pulsed torque commands in synchronization with the first controller.

At 1302, vehicle operating conditions are determined. Vehicle operating conditions may include, but are not limited to driver demand torque, vehicle speed, electric machine speed, and vehicle drive mode (e.g., two-wheel drive, four-wheel drive, etc.). Method 1300 proceeds to 1304.

At 1304, method 1300 judges whether or not synchronized torque pulsation (e.g., delivering torque pulses to two electric machines) is enabled. Synchronized torque pulsation may be enabled when it is determined that the vehicle is operating at conditions where synchronized torque pulsations may increase electric drive efficiency. In one example, method 1300 may make such a determination based on a relationship between drive losses and total powertrain torque as shown in FIG. 4. For example, if driver demand torque and powertrain torque is between torque t0 and torque t2 as shown in FIG. 4, method 1300 may judge that synchronized torque pulsations are to be generated and enabled. If method 1300 judges that synchronized torque pulsations are to be enabled, the answer is yes and method 1300 proceeds to 1308. Otherwise, the answer is no and method 1300 proceeds to 1306.

At 1306, method 1300 operates one or two electric drives in a continuous mode where torque pulsations are not provided. When operating in continuous mode, the two electric drives may be supplied with torque commands or requests that are based on driver demand torque and vehicle speed or electric machine speed. Method 1300 exists after entering continuous torque mode.

At 1308, method 1300 judges whether or not there is a torque pulse transient. If so, the answer is yes and method 1300 proceeds to 1316. Otherwise, the answer is no and method 1300 proceeds to 1314. In one example, the torque pulse transient may be a change in a pulsed torque command, such as a rising or falling edge of a signal, an increase of greater than a threshold amount of a variable, or other signal feature. Thus, method 1300 may synchronize pulsed torque commands on an event level.

At 1314, method 1300 commands no change to the pulsed torque commands of the second electric drive and second electric machine. Method 1300 proceeds to exit.

At 1316, method 1300 performs adjustments to the pulsed torque commands of the second electric drive and second electric machine. The adjustments may include adjustments to torque pulse command magnitude, torque pulse command duty cycle, and torque pulse command phase as shown in FIGS. 14-17. The adjustments may be based on vehicle operating conditions including but not limited to electric machine rotational speed, vehicle speed, electric machine temperature, and driver demand torque. Method 1300 proceeds to 1318.

At 1318, method 1300 commands the second electric drive and second electric machine with the adjusted torque pulse commands. Method 1300 proceeds to exit.

In this way, even if the first electric machine is generating random torque pulsation commands, the operation of the second electric machine may be synchronized to the operation of the first electric machine. Consequently, the control may be distributed while maintaining synchronization between electric machines.

Figure 14:
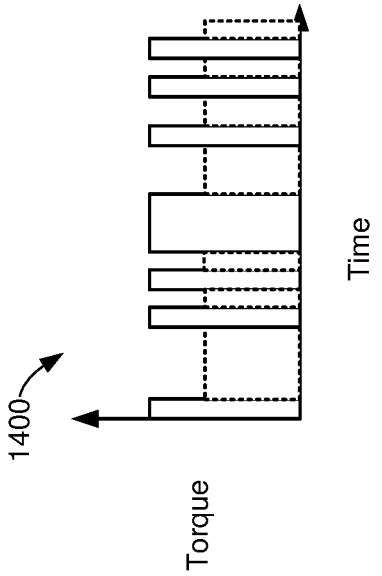
FIGS. 14-17 show plots of additional ways that synchronized torque pulsation commands may be adjusted.

Referring now to FIG. 14, a plot 1400 shows how pulsed torque commands or requests may be generated by the method of FIG. 13. In this example, the pulsed torque commands for the second electric drive and second electric machine are complementary and synchronous in event with pulsed torque commands of the first electric drive and first electric machine.

In this example, the pulsed torque commands or requests are also generated in response to a constant driver demand torque request. Plot 1400 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 1402 represents pulsed torque commands for the first electric drive and electric machine. Dashed trace 1404 represents pulsed torque commands for the second electric drive and electric machine.

In this example, the pulsed torque commands for the first electric drive and first electric machine are generated randomly via a first controller. A second controller may generate pulsed torque commands for the second electric drive and second electric machine according to the pulsed torque values or another signal from the first controller. Here, the pulsed torque commands for the second electric machine are at a higher non-zero value when pulsed torque commands for the first electric machine are zero or near zero. Thus, the pulsed torque commands for the second electric machine and second electric drive are complementary to those of the first electric drive and first electric machine.

Figure 15:
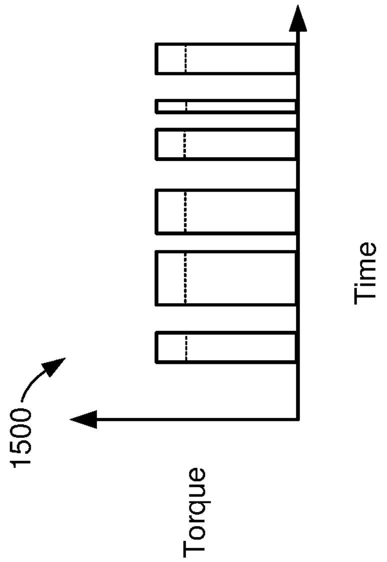

Referring now to FIG. 15, a plot 1500 shows how pulsed torque commands or requests may be generated by the method of FIG. 13. In this example, the pulsed torque commands for the second electric drive and second electric machine are at a same time and synchronous in event with those of the first electric drive and first electric machine.

In this example, the pulsed torque commands or requests are also generated in response to a constant driver demand torque request. Plot 1500 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 1502 represents pulsed torque commands for the first electric drive and electric machine. Dashed trace 1504 represents pulsed torque commands for the second electric drive and electric machine.

Here again, the pulsed torque commands for the first electric drive and first electric machine are generated randomly via a first controller. A second controller may generate pulsed torque commands for the second electric drive and second electric machine according to the pulsed torque values or another signal from the first controller. In this example, the pulsed torque commands for the second electric machine are at a higher non-zero value when pulsed torque commands for the first electric machine are at a higher non-zero level. Thus, the pulsed torque commands of the second electric driver and second electric machine are mimicked in frequency, phase, and duty cycle with the pulsed torque commands of the first electric drive and first electric machine.

Referring now to FIG. 16, a plot 1600 shows how pulsed torque commands or requests may be generated by the method of FIG. 13. In this example, the pulsed torque commands for the second electric drive and second electric machine are delayed and synchronous in event with those of the first electric drive and first electric machine.

In this example, the pulsed torque commands or requests are also generated in response to a constant driver demand torque request. Plot 1600 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 1602 represents pulsed torque commands for the first electric drive and electric machine. Dashed trace 1604 represents pulsed torque commands for the second electric drive and electric machine.

In FIG. 16, the pulsed torque commands for the first electric drive and first electric machine are generated randomly via a first controller. A second controller may generate pulsed torque commands for the second electric drive and second electric machine according to the pulsed torque values or another signal from the first controller. In this example, the pulsed torque commands for the second electric machine are delayed in time with respect to the pulsed torque commands of the first electric drive and first electric machine.

Figure 17:
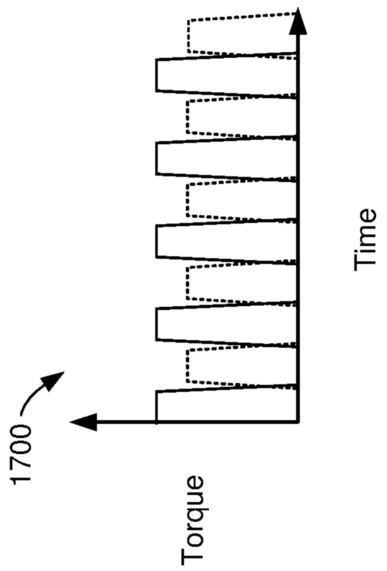

Turning now to FIG. 17, a plot 1700 shows how pulsed torque commands or requests may be generated by the method of FIG. 13. In this example, the pulsed torque commands for the second electric drive and second electric machine are adjusted with transient synchronous modifications.

In FIG. 17, the pulsed torque commands or requests are also generated in response to a constant driver demand torque request. Plot 1700 includes a vertical axis that represents a torque command or request value of the synchronized pulsed torque commands and the torque command value of the pulsed torque commands increases in the direction of the vertical axis arrow. The horizontal axis represents time and time increases in the direction of the horizontal axis arrow. Solid line trace 1702 represents pulsed torque commands for the first electric drive and electric machine. Dashed trace 1704 represents pulsed torque commands for the second electric drive and electric machine.

In this example, the pulsed torque commands for the first electric drive and first electric machine are adjusted to change the amount of time it takes to move from a lower pulse value to a higher pulse value and vise-versa. A second controller may generate pulsed torque commands for the second electric drive and second electric machine according to the pulsed torque values or another signal from the first controller. For FIG. 17, the pulsed torque commands for the second electric machine change the amount of time to transition from a low pulse level to a high pulse level and vise-versa in response to similar adjustments that have been made to the pulsed torque commands for the first electric drive and the first electric machine.

Referring now to FIG. 18, a block diagram of a third method to provide synchronized torque pulsations to two different electric drives is shown. The method of FIG. 18 may be included as executable instructions in non-transitory memory of one or more controllers. Further, the method of FIG. 18 may be performed via the system of FIGS. 1 and 2. Further still, the method of FIG. 18 may be performed in cooperation with the methods of FIGS. 5 and 13. The method of FIG. 18 may also include actions taken in the physical world to transform operating states of the system of FIGS. 1 and 2. The method of FIG. 18 may execute when a vehicle is operating at predetermined conditions (e.g., a particular speed and driver demand torque range).

At 1802, vehicle operating conditions are determined. Vehicle operating conditions may include, but are not limited to driver demand torque, vehicle speed, electric machine speed, and vehicle drive mode (e.g., two-wheel drive, four-wheel drive, etc.). Method 1800 proceeds to 1804.

At 1806, method 1800 judges whether or not pulsed torque commands lowers electric drive system losses at the present vehicle operating conditions. In one example, method 1800 may determine an answer according to a relationship as shown in FIG. 4. If method 1800 judges that pulsed torque commands lower electric drive system losses at the present operating conditions, the answer is yes and method 1800 proceeds to 1804. Otherwise, the answer is no and method 1800 proceeds to 1806.

At 1806, method 1800 operates one or two electric drives in a continuous mode where torque pulsations are not provided. When operating in continuous mode, the two electric drives may be supplied with torque commands or requests that are based on driver demand torque and vehicle speed or electric machine speed. Method 1800 exists after entering continuous torque mode.

At 1808, method 1800 judges whether or not synchronized torque pulsation (e.g., delivering torque pulses to two electric machines) is enabled. Synchronized torque pulsation may be enabled when it is determined that the vehicle is operating at conditions where synchronized torque pulsations may increase electric drive efficiency. In one example, method 1800 may make such a determination based on a relationship between drive losses and total powertrain torque as shown in FIG. 4. For example, if driver demand torque and powertrain torque is between torque t0 and torque t2 as shown in FIG. 4, method 1800 may judge that synchronized torque pulsations are to be generated and enabled. If method 1800 judges that synchronized torque pulsations are to be enabled, the answer is yes and method 1800 proceeds to 1812. Otherwise, the answer is no and method 1800 proceeds to 1810.

At 1810, method 1800 delivers pulsed torque commands that are independent and not synchronized to two electric drives and two electric machines. Method 1800 may operate two electric drives and two electric machines with pulsed torque commands having different frequencies, magnitudes, duty cycles, and/or phase. Method 1800 proceeds to exit.

At 1812, method 1800 indexes or references tables and/or functions that output pulsed torque signal attributes that may include but are not limited to frequency, duty cycle, phase, and magnitude. The tables and/or functions may be referenced based on individual electric machine average torque requests as determined at 1810. In one example, method 1800 may determine driver demand torque and vehicle speed and determine an average torque that is to be requested or commanded for each electric drive and electric machine. The driver demand torque may be split between the two electric machines according to a predetermined ratio. Additionally, the tables and/or functions may be referenced or indexed by noise and vibration characteristics and loss profiles (e.g., as shown in the relationship of FIG. 4) as indicated at 1816. The tables or functions output attributes for pulsed torque commands. Method 1800 proceeds to 1820.

At 1820, method 1800 generates synchronized pulsed torque commands for the first electric drive, the first electric machine, the second electric drive, and the second electric machine according to the attributes determined at 1812. In one example, method 1800 may generate the synchronized pulsed torque commands via a pulse generating algorithm that may execute at a fixed time interval. Alternatively, method 1800 may generate the pulsed torque commands by following one or more predetermined pulse profiles that are stored in controller memory. Method 1800 commands the first electric drive and the second electric drive with pulsed torque commands as shown in FIGS. 6-12, for example. Method 1800 exits.

In this way, synchronized torque commands may be optimized to reduce noise and vibration. The adjustments may be varied according to vehicle operating conditions.

Referring now to FIG. 19, an example of how a pulsed torque command or request may be generated is shown. Plot 1900 includes a vertical axis and a horizontal axis. The vertical axis represents a torque request value (e.g., 0-600 Newton-meters) and the torque request value increases in the direction of the vertical axis arrow. The horizontal axis represents time and time increases from the left side of the figure to the right side of the figure.

In this example, the pulsed torque request is either one of two values. Namely, the pulsed torque request value is the lower bound (e.g., zero) or the upper bound (e.g., Thigh). The average pulsed torque is equal to Tdes, which is equal to a constant driver demand torque that is being requested. The pulsed torque request is comprised of individual values that are indicated via dots that are similar to dot 1902 and dot 1904. The line that links the dots is provided to visually increase the plot, not to indicate that there are any intermediate torque values between 0 and Thigh because there are none. These individual values may be updated at a predetermined rate via the controller to permit generation of a pulse torque request at a desired frequency. The torque pulse request traces shown herein show a line between the lower bound values and values in the pulses (e.g., non-lower bound values). The line is not to be understood as showing intermediate torque values between lower bound values and values in the respective torque pulses. It may be appreciated that the lower bound values described herein may be other than zero.

The methods described herein provide for a method for an electric drive system, comprising: generating synchronized pulsed torque commands for a first electric machine and a second electric machine, where the synchronized pulsed torque commands for the first electric machine having a first frequency, and where the synchronized pulsed torque commands for the second electric machine have the first frequency. In a second example, that may include the first example, the method includes where the synchronized pulsed torque commands for the first electric machine have a first magnitude, where the synchronized pulsed torque commands for the second electric machine have a second magnitude, where the second magnitude is greater than the first magnitude. In a third example that may include one or both of the first and second examples, the method includes where the synchronized pulsed torque commands for the first electric machine have a first duty cycle, and where the synchronized pulsed torque commands for the second electric machine have a second duty cycle, the second duty cycle different than the first duty cycle. In a fourth example that may include one or more of the first through third examples, the method includes where a timing of the synchronized pulsed torque commands for the first electric machine overlaps a timing of the synchronized pulsed torque commands for the second electric machine. In a fifth example that may include one or more of the first through fourth examples, the method includes where a timing of the synchronized pulsed torque commands for the first electric machine does not overlap a timing of the synchronized pulsed torque commands for the second electric machine. In a sixth example that may include one or more of the first through fifth examples, the method includes where the synchronized pulsed torque commands for the first electric machine and the second electric machine vary according to a driver demand torque. In a seventh example that may include one or more of the first through sixth examples, the method includes where the synchronized pulsed torque commands for the first electric machine and the second electric machine vary according to a loss profile for the electric drive system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not important to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, different types of electric machines may use the present description to advantage.

The invention claimed is:

1. An electric drive system, comprising:

a first inverter, a first electric machine, a second inverter, a second electric machine; and one or more controllers including executable instructions stored in non-transitory memory that cause the one or more controllers to generate synchronized pulsed torque commands for the first electric machine and the second electric machine, where pulsed torque commands generated for the second electric machine are randomly adjusted.

2. The electric drive system of claim 1, where the synchronized pulsed torque commands alternate between a first range of torque values and a second value, where the second value is less than the first range of torque values.

3. The electric drive system of claim 2, where the synchronized pulsed torque commands for the first electric machine and the second electric machine have a same frequency.

4. The electric drive system of claim 3, where synchronized pulsed torque commands for the first electric machine and the second electric machine have different duty cycles.

5. The electric drive system of claim 3, where synchronized pulsed torque commands for the first electric machine and the second electric machine have same duty cycles.

6. The electric drive system of claim 3, where synchronized torque pulse commands for the first electric machine and second electric machine include timing of torque pulses for the first electric machine that overlap timing of torque pulses for the second electric machine.

7. The electric drive system of claim 3, where synchronized pulsed torque commands for the first electric machine and second electric machine include timing of torque pulses for the first electric machine that do not overlap timing of torque pulses for the second electric machine.

8. The electric drive system of claim 3, where the synchronized pulsed torque commands include pulsed torque commands for the first electric machine and pulsed torque commands for the second electric machine that synchronize on a pulse event level of the pulsed torque commands for the first electric machine.

9. A method for an electric drive system, comprising:

generating synchronized pulsed torque commands for a first electric machine and a second electric machine, where the synchronized pulsed torque commands for the first electric machine have a first frequency, and where the synchronized pulsed torque commands for the second electric machine have the first frequency; and randomly adjusting the synchronized pulsed torque commands generated for the first electric machine, and adjusting the synchronized pulsed torque commands generated for the second electric machine in response to the synchronized pulsed torque commands for the first electric machine.

10. The method of claim 9, where the synchronized pulsed torque commands for the first electric machine have a first magnitude, where the synchronized pulsed torque commands for the second electric machine have a second magnitude, where the second magnitude is greater than the first magnitude.

11. The method of claim 9, where the synchronized pulsed torque commands for the first electric machine have a first duty cycle, and where the synchronized pulsed torque commands for the second electric machine have a second duty cycle, the second duty cycle different than the first duty cycle.

12. The method of claim 9, where a timing of the synchronized pulsed torque commands for the first electric machine overlaps a timing of the synchronized pulsed torque commands for the second electric machine.

13. The method of claim 9, where a timing of the synchronized pulsed torque commands for the first electric machine does not overlap a timing of the synchronized pulsed torque commands for the second electric machine.

14. The method of claim 9, where randomly adjusting the synchronized pulsed torque commands generated for the first electric machine includes randomly adjusting magnitudes of the synchronized pulsed torque commands for the first electric machine.

15. The method of claim 9, where randomly adjusting the synchronized pulsed torque commands generated for the first electric machine includes randomly adjusting phase of the synchronized pulsed torque commands for the first electric machine.

16. An electric drive system, comprising:

a first inverter, a first electric machine, a second inverter, a second electric machine; and one or more controllers including executable instructions stored in non-transitory memory that cause the one or more controllers to generate synchronized pulsed torque commands for the first electric machine and the second electric machine, where the synchronized pulsed torque commands for the first electric machine and the second electric machine are randomly generated based on a loss profile.

17. The electric drive system of claim 16, where the loss profile describes a relationship between losses of the electric drive system and torque generated via the first electric machine and the second electric machine.

18. The electric drive system of claim 16, where the synchronized pulsed torque commands alternate between a first range of torque values and a second torque value, where the second torque value is lower than the first range of torque values.

19. The electric drive system of claim 18, where phase of the synchronized pulsed torque commands are randomly adjusted in response to speeds and torques of the first electric machine and the second electric machine.

20. The electric drive system of claim 16, where magnitudes of the synchronized pulsed torque commands are randomly adjusted in response to speeds and torques of the first electric machine and the second electric machine.

* * * * *